United States Patent
Kojo

(10) Patent No.: US 10,246,128 B2
(45) Date of Patent: Apr. 2, 2019

(54) TRAVEL CONTROL DEVICE FOR VEHICLE

(71) Applicant: TOYOTA JIDOSHA KABUSHIKI KAISHA, Toyota-shi, Aichi-ken (JP)

(72) Inventor: Takahiro Kojo, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/229,401

(22) Filed: Aug. 5, 2016

(65) Prior Publication Data

US 2017/0036692 A1     Feb. 9, 2017

(30) Foreign Application Priority Data

Aug. 7, 2015   (JP) ................................. 2015-157655

(51) Int. Cl.

| | |
|---|---|
| *B62D 6/00* | (2006.01) |
| *B62D 5/00* | (2006.01) |
| *B62D 5/04* | (2006.01) |
| *B62D 6/06* | (2006.01) |
| *B62D 15/02* | (2006.01) |

(52) U.S. Cl.
CPC ............. *B62D 6/002* (2013.01); *B62D 5/008* (2013.01); *B62D 5/0463* (2013.01); *B62D 5/0472* (2013.01); *B62D 6/06* (2013.01); *B62D 15/025* (2013.01)

(58) Field of Classification Search
CPC ..................................................... B62D 6/003
See application file for complete search history.

(56) References Cited

U.S. PATENT DOCUMENTS 8,886,412 B2 * 11/2014 Rosol .................... B60W 10/20
                                                      180/402
9,707,996 B2 * 7/2017 Ueyama ............. B62D 15/0255
(Continued)

FOREIGN PATENT DOCUMENTS

| | | |
|---|---|---|
| DE | 102006044179 A1 | 9/2007 |
| JP | 3758649 B2 | 3/2006 |

(Continued)

OTHER PUBLICATIONS

Communication dated Feb. 7, 2017, from the European Patent Office in counterpart European Application No. 16182651.6.

*Primary Examiner* — Alex C Dunn
(74) *Attorney, Agent, or Firm* — Sughrue Mion, PLLC

(57) ABSTRACT

A travel control device for vehicle (10) includes a steering transmission ratio variable device (14), a steering transmission ratio control device (16) configured to carry out such control that an actual relative rotational angle (θre) of the steering transmission ratio variable device reaches a target value (θret), a power steering device (18), a steering assist torque control device (20) configured to control the power steering device, and a driving support device (22) configured to correct a target steering assist torque so that an actual steering angle of steered wheels (19FL, 19FR) reaches a target steering angle for driving support. When the driving support device is in operation (Step 140), the magnitude of a change in a relative rotational angle generated by the control of the steering transmission ratio variable device is decreased (Step 150 to 200) compared to a case in which the driving support device is not in operation.

7 Claims, 8 Drawing Sheets

(56) References Cited

U.S. PATENT DOCUMENTS

| | | | |
|---|---|---|---|
| 2004/0070189 A1 | 4/2004 | Nakatsu et al. | |
| 2005/0016788 A1* | 1/2005 | Hidaka | B62D 5/008 180/443 |
| 2008/0021612 A1 | 1/2008 | Sakuma | |
| 2011/0022268 A1* | 1/2011 | Kojo | B62D 5/008 701/41 |
| 2012/0197496 A1* | 8/2012 | Limpibunterng | B62D 1/286 701/42 |
| 2012/0203431 A1* | 8/2012 | Kojo | B62D 5/008 701/41 |
| 2013/0124045 A1* | 5/2013 | Suzuki | B62D 5/008 701/41 |
| 2013/0190988 A1* | 7/2013 | Limpibunterng | B62D 5/008 701/42 |
| 2013/0253767 A1* | 9/2013 | Lee | B60W 50/04 701/42 |
| 2013/0253770 A1* | 9/2013 | Nishikawa | B62D 6/003 701/42 |
| 2013/0261898 A1* | 10/2013 | Fujita | B62D 7/159 701/42 |
| 2015/0175199 A1* | 6/2015 | Kuramochi | B62D 6/10 701/41 |
| 2015/0353128 A1* | 12/2015 | Shibuya | B60W 10/02 701/41 |

FOREIGN PATENT DOCUMENTS

| | | |
|---|---|---|
| JP | 2006-206011 A | 8/2006 |
| JP | 2007-160998 A | 6/2007 |
| JP | 2009-184675 A | 8/2009 |
| JP | 2011-31770 A | 2/2011 |
| JP | 4640395 B2 | 3/2011 |
| JP | 5737197 B2 | 6/2015 |
| WO | 2009125271 A1 | 10/2009 |

* cited by examiner

TRAVEL CONTROL DEVICE FOR VEHICLE

CROSS-REFERENCE TO RELATED APPLICATIONS

The disclosure of Japanese Patent Application No. JP 2015-157655 filed on Aug. 7, 2015 is incorporated herein by reference in its entirety.

BACKGROUND

1. Technical Field

The present disclosure relates to a travel control device for a vehicle including a steering transmission ratio variable device and a power steering device.

2. Description of the Related Art

As a travel control device for vehicles such as a motor vehicle, there has hitherto been well known a travel control device including a steering transmission ratio variable device and an electric power steering device in a steering transmission system between a steering wheel and steered wheels. The steering transmission ratio variable device is arranged between an upper steering shaft and a lower steering shaft, and is configured to rotate the lower steering shaft with respect to the upper steering shaft, thereby changing a steering transmission ratio. This type of travel control device is allowed to control a steering angle of the steered wheels without requiring a steering operation by the driver, thereby being capable of optimally controlling the steering transmission ratio, namely, a ratio of a change amount in a steering angle of the steered wheels with respect to an operation amount of the steering wheel depending on a vehicle speed or the like.

Further, there is also known a travel control device including a driving support device configured to calculate a target steering angle of the steered wheels for causing the vehicle to travel along a predetermined travel path, and to control the electric power steering device and the steering transmission ratio variable device so that an actual steering angle of the steered wheels conforms to the target steering angle. The travel control device including the driving support device may cause the vehicle to travel along the predetermined travel path, and may attain desired steering characteristics without requiring the steering operation by the driver.

For example, in Japanese Patent Application Laid-open No. 2011-31770, there is described a travel control device configured to carry out driving support control of controlling the electric power steering device, to thereby control the steering angle of the steered wheels so that the vehicle travels along a predetermined travel path, and to suppress a behavior change of the vehicle generated during the driving support control. With the travel control device described in Japanese Patent Application Laid-open No. 2011-31770, the vehicle can be caused to travel along the predetermined travel path while suppressing the behavior change of the vehicle.

However, there are the following problems in a related-art travel control device in which the electric power steering device is installed in the steering transmission system between the steered wheels and the steering transmission ratio variable device like the travel control device described in Japanese Patent Application Laid-open No. 2011-31770. Specifically, when the electric power steering device is controlled through the driving support control and the steering angle of the steered wheels is changed, a steering member like a lower steering shaft between the electric power steering device and the steering transmission ratio variable device is rotated. A friction force acts between members rotating relatively to each other in the steering transmission ratio variable device. Thus, when those members cannot rotate relatively to each other due to the friction force, an upper steering shaft on a steering wheel side and the lower steering shaft on a steered wheel side with respect to the steering transmission ratio variable device do not rotate relatively to each other, but integrally rotate.

A steering angle sensor configured to detect a steering angle required to control the steering transmission ratio and the like is installed on the upper steering shaft, and thus the steering angle detected by the steering angle sensor changes as the upper steering shaft rotates. The steering transmission ratio variable device is controlled so as to attain a predetermined steering transmission ratio based on a changing steering angle, and thus the steering transmission ratio variable device tries to rotate the lower steering shaft with respect to the upper steering shaft even when the driver is not steering. However, the electric power steering device is generating a steering torque so as to change the steering angle of the steered wheels, and thus the steering transmission ratio variable device cannot rotate the lower steering shaft, while the upper steering shaft is rotated by a reaction force.

In particular, while the driving support control is being carried out, the driver does not need to actively carry out the steering, a force of the driver for gripping the steering wheel is low, and a so-called hands-off state may be brought about. Therefore, a repetition of the above-mentioned phenomenon causes a repetition of a reciprocal rotation of the upper steering shaft. As a result, a minute vibration of the steering wheel and a vibration change in a steering reaction force are liable to be generated, and the driver may feel a sense of discomfort and a sense of annoyance.

In the travel control device described in Japanese Patent Application Laid-open No. 2011-31770, as shown in FIG. 8 of Japanese Patent Application Laid-open No. 2011-31770, when the driving support control is being carried out, the steering transmission ratio is changed toward a small side (so-called slow side) compared to a case in which the driving support control is not being carried out over an entire vehicle speed range. Thus, influence of the steering operation by the driver exerted on the change in the steering angle of the steered wheels can be reduced, thereby increasing a travel stability of the vehicle, but the problem of the minute vibration of the steering wheel and the vibration change in the steering reaction force cannot be solved.

SUMMARY

It is a primary object of exemplary aspects of the present disclosure to reduce the minute vibration of the steering wheel and the vibration change in the steering reaction force generated when the steering angle of the steered wheels is controlled through the driving support control in a vehicle provided with the steering transmission ratio variable device and the power steering device.

According to one embodiment of the present disclosure, there is provided a travel control device for a vehicle, including: a steering transmission ratio variable device, which is installed in a steering transmission system between a steering wheel and steered wheels, and is configured to rotate a lower steering shaft with respect to an upper steering shaft, to thereby change a steering transmission ratio; a steering transmission ratio controller, which is configured to calculate a target value of a relative rotational angle between the upper steering shaft and the lower steering shaft, which is required to achieve a target steering transmission ratio, and to control the steering transmission ratio variable device so that an actual relative rotational angle conforms to the target value; a power steering device, which is installed in the steering transmission system between the steered wheels and the steering transmission ratio variable device, and is configured to generate a steering assist torque; a steering assist torque controller, which is configured to calculate a target steering assist torque, and to control the power steering device so that an actual steering assist torque conforms to the target steering assist torque; and a driving support controller, which is configured to calculate a target steering angle of the steered wheels for causing the vehicle to travel along a predetermined travel path, and to correct the target steering assist torque so that an actual steering angle of the steered wheels conforms to the target steering angle.

The steering transmission ratio controller is configured to decrease a magnitude of a change in the relative rotational angle controlled by the steering transmission ratio variable device when the driving support controller is engaged compared to when the driving support controller is not engaged.

With the above-mentioned configuration, the magnitude of the change in the relative rotational angle controlled by the steering transmission ratio variable device is small (including 0) when the driving support controller is engaged compared to when the driving support controller is not engaged. Thus, under the state in which the driving support controller is engaged, the magnitude of the rotational angle of the upper steering shaft rotated by the reaction force generated when the steering transmission ratio variable device rotates the lower steering shaft can be reduced. Thus, the possibility of the repetition of the reciprocal rotation of the steering shaft on the steering wheel side can be reduced, thereby reducing the minute vibration of the steering wheel and the vibration change in the steering reaction force.

[Aspects of the Present Disclosure]

In one aspect of the present disclosure, the steering transmission ratio controller is configured to calculate the target value of the relative rotational angle to be 0 when the driving support controller is engaged.

According to the above-mentioned aspect, when the driving support controller is engaged, the target value of the relative rotational angle is calculated to be 0, and thus the steering transmission system is equivalent to a steering transmission system in which the steering transmission ratio variable device is not installed. Thus, the steering transmission ratio variable device does not try to rotate the lower steering shaft with respect to the upper steering shaft, and thus the reaction force is not generated. Thus, the repetition of the reciprocal rotation of the steering shaft on the steering wheel side can be prevented, thereby preventing the minute vibration of the steering wheel and the vibration change in the steering reaction force from being generated.

In another aspect of the present disclosure, the steering transmission ratio controller is configured to acquire, when the driving support controller starts an operation thereof, a current value of the relative rotational angle, and calculate, when the driving support controller is engaged, the target value of the relative rotational angle to be the current value, to thereby cause the change in the relative rotational angle controlled by the steering transmission ratio variable device to be 0.

According to the above-mentioned aspect, when the driving support controller starts the operation, the current value of the relative rotational angle is acquired. When the driving support controller is engaged, the target value of the relative rotational angle is calculated to be this current value. Thus, when the driving support controller is engaged, the actual relative rotational angle is the same as the target value of the relative rotational angle, and thus the steering transmission ratio variable device does not try to rotate the lower steering shaft with respect to the upper steering shaft, and the reaction force is not generated. Thus, the repetition of the reciprocal rotation of the steering shaft on the steering wheel side can be prevented, thereby preventing the minute vibration of the steering wheel and the vibration change in the steering reaction force from being generated.

Further, in another aspect of the present disclosure, the steering transmission ratio variable device includes a lock device configured to block a relative rotation between the upper steering shaft and the lower steering shaft, and the steering transmission ratio controller is configured to operate, when the driving support controller is engaged, the lock device so that the change in the relative rotational angle controlled by the steering transmission ratio variable device is 0.

According to the above-mentioned aspect, when the driving support controller is engaged, through operation of the lock device, the change in the relative rotational angle controlled by the steering transmission ratio variable device is maintained to be 0. Thus, the steering wheel side and the lower steering shaft are in a state of being integrally coupled to each other via the steering transmission ratio variable device, the lower steering shaft is not thus rotated with respect to the upper steering shaft, and the reaction force is not generated. Thus, the repetition of the reciprocal rotation of the steering shaft on the steering wheel side can be prevented, thereby preventing the minute vibration of the steering wheel and the vibration change in the steering reaction force from being generated.

Further, in another aspect of the present disclosure, the steering transmission ratio controller is configured to apply, based on the target value of the relative rotational angle and a current value of the relative rotational angle, feedback control to the steering transmission ratio variable device so that a magnitude of a difference between the target value of the relative rotational angle and the current value of the relative rotational angle decreases, and to decrease a gain of the feedback control when the driving support controller is engaged compared to when the driving support controller is not engaged.

According to the above-mentioned aspect, in a case in which the driving support controller is engaged, the gain of the feedback control is low compared to a case in which the driving support controller is not engaged, the magnitude of the control amount of the steering transmission ratio variable device is small, and the magnitude of the change in the relative rotational angle controlled by the steering transmission ratio variable device is small. Thus, under the state in which the driving support controller is engaged, the angle and the magnitude of the reaction force of the rotation of the lower steering shaft rotated with respect to the upper steering shaft through the control of the steering transmission ratio variable device can be reduced. Thus, the possibility of the repetition of the reciprocal rotation of the steering shaft on the steering wheel side can be reduced, thereby reducing the minute vibration of the steering wheel and the vibration change in the steering reaction force.

Further, in another aspect of the present disclosure, the vehicle includes a switch to be operated by an occupant, configured to switch between an engaged position in which the driving support controller is engaged and a non-engaged position in which the driving support controller is not engaged, and the steering transmission ratio control device is configured to determine, when the switch is in the engaged position, that the driving support controller is in engaged.

According to the above-mentioned aspect, when the switch is in the engaged position, the driving support controller is determined to be engaged. Thus, without detecting the operation state of the driving support controller, it can be determined whether or not the driving support controller is engaged by the determination of the position of the switch.

Further, in another aspect of the present disclosure, the driving support controller is configured to calculate, even when the switch is in the non-engaged position, a target steering angle of the steered wheels required for an emergency avoidance, and carry out emergency avoidance steering of correcting the target steering assist torque so that the actual steering angle of the steered wheels conforms to the target steering angle, and the steering transmission ratio controller is configured to determine, also when the emergency avoidance steering is being carried out, that the driving support controller is engaged.

According to the above-mentioned aspect, even when the switch is in the non-engaged position, when the emergency avoidance steering is being carried out, the driving support controller is determined to be engaged. Thus, under the state in which the emergency avoidance steering, which is a type of the driving support, is being carried out, the magnitude of the change in the relative rotational angle controlled by the steering transmission ratio variable device can be reduced.

DETAILED DESCRIPTION

Now, with reference to the accompanying drawings, some preferred embodiments of the present disclosure are described in detail.

First Embodiment

Figure 1:
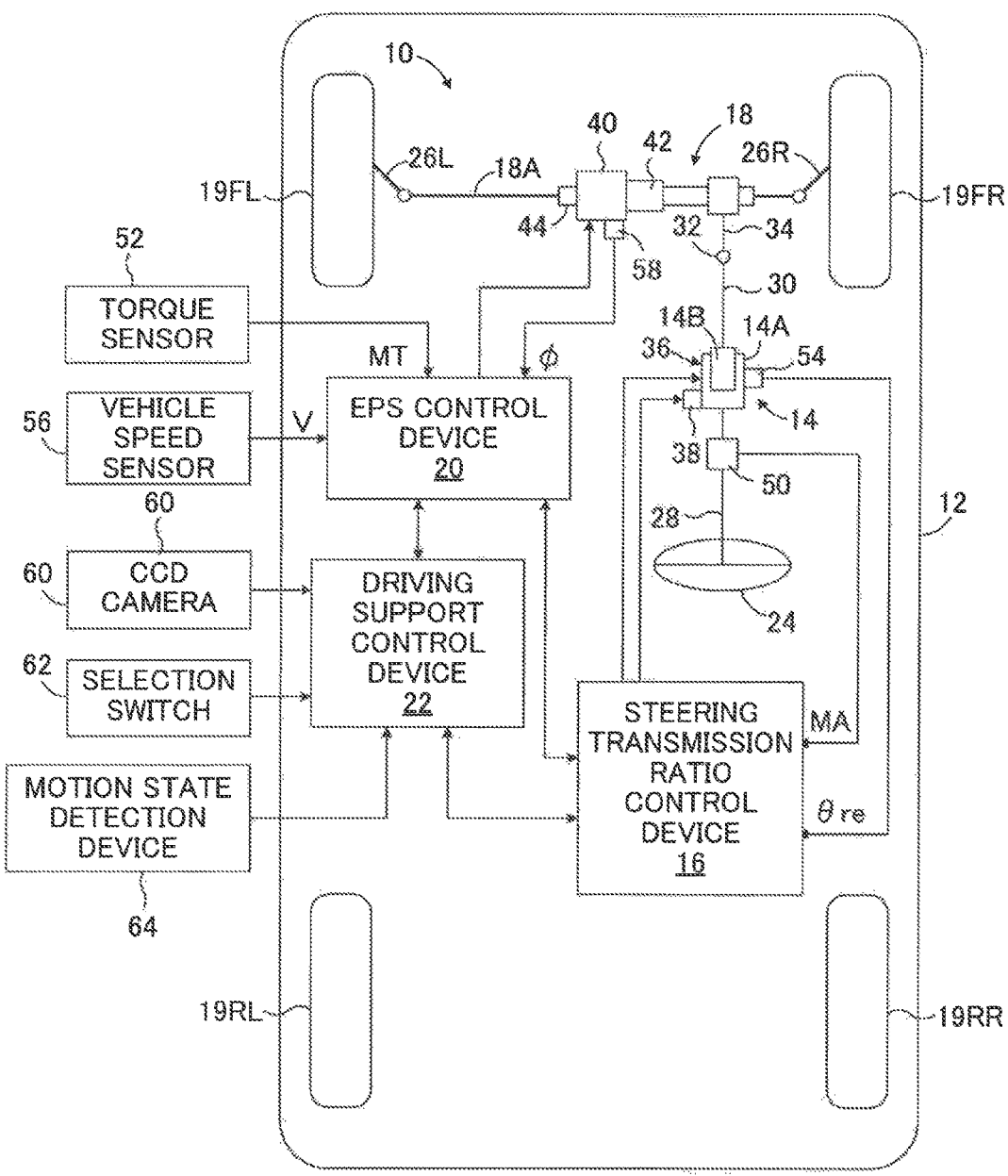
FIG. 1 is a schematic configuration diagram for illustrating a travel control device for a vehicle according to a first embodiment of the present disclosure.

FIG. 1 is a schematic configuration diagram for illustrating a travel control device 10 according to a first embodiment of the present disclosure, which is installed in a vehicle 12. The travel control device 10 includes a steering transmission ratio variable device 14, a steering transmission ratio control device 16 configured to control the steering transmission ratio variable device 14, an electric power steering (EPS) device 18, an EPS control device 20 serving as a steering assist torque control device configured to control the electric power steering device 18, and a driving support control device 22. As illustrated in FIG. 1, the vehicle 12 includes front left and right wheels 19FL and 19FR, which are steered wheels, and rear left and right wheels 19RL and 19RR, which are non-steered wheels. The front left and right wheels 19FL and 19FR are steered via a rack bar 18A and tie rods 26L and 26R by the electric power steering device 18 driven in response to an operation by a driver on a steering wheel 24.

The steering wheel 24 is connected to a pinion shaft 34 of the power steering device 18 via a steering wheel steering shaft (herein referred to as "upper steering shaft") 28, a steering transmission ratio variable device 14, a lower steering shaft 30, and a universal joint 32. The steering transmission ratio variable device 14 includes a motor 36, and the motor 36 is coupled to a bottom end of the upper steering shaft 28 on a housing 14A side, and coupled to a top end of the lower steering shaft 30 on a rotor 14B side via a speed reduction mechanism (not shown).

The steering transmission ratio variable device 14 is configured to rotate the lower steering shaft 30 relatively to the upper steering shaft 28, thereby changing a steering transmission ratio. Thus, the steering transmission ratio variable device 14 functions as a variable gear ratio steering (VGRS) system configured to increase/decrease a steering gear ratio (reciprocal of the steering transmission ratio). A detailed description is later given of control for the steering transmission ratio variable device 14 by the steering transmission ratio control device 16.

The steering transmission ratio variable device 14 includes a lock device 38 configured to be switched between an unlock position for allowing the rotation of the rotor 14B with respect to the housing 14A and a lock position for blocking the rotation of the rotor 14B with respect to the housing 14A. The lock device 38 allows the relative rotation between the upper steering shaft 28 and the lower steering shaft 30 in the unlock position, but blocks the relative rotation between the two steering shafts 28 and 30 in the lock position.

The lock device 38 may be a device having any configuration as long as the device can switch the allowance and the block of the relative rotation between the upper steering shaft 28 and the lower steering shaft 30. For example, the lock device 38 may have a structure described in Japanese Patent No. 3758649 or Japanese Patent No. 4640395.

In the first embodiment, the electric power steering device 18 is a rack coaxial type electric power steering device, and includes a motor 40, and a conversion mechanism 42, such as a ball screw mechanism, configured to convert a rotational torque of the motor 40 into a force in a reciprocating direction of the rack bar 18A. The electric power steering device 18 is configured to generate an auxiliary steering torque for driving the rack bar 18A relatively to the housing 44, thereby reducing a steering load on the driver, and to generate a drive torque for automatically steering the front wheels 19FL and 19FR. A detailed description is later given of control of the electric power steering device 18 by the EPS control device 20.

As appreciated from the description given above, the upper steering shaft 28, the lower steering shaft 30, the pinion shaft 34, the rack bar 18A, the tie rods 26L and 26R, and the like form a steering transmission system between the steering wheel 24 and the front wheels 19FL and 19FR. The steering transmission ratio variable device 14 is installed in the steering transmission system between the upper steering shaft 28 and the lower steering shaft 30. The electric power steering device 18 is installed in the steering transmission system between the steering transmission ratio variable device 14 and the front wheels 19FL and 19FR.

The steering transmission ratio variable device 14 may be a device having any configuration as long as the device can change the steering transmission ratio. Moreover, the electric power steering device 18 may be a device having another structure such as a column assist type power steering device as long as the device can reduce the steering load on the driver and generate the steering force for automatically steering the front left and right wheels 19FL and 19FR.

In the first embodiment, on the upper steering shaft 28, a steering angle sensor 50 configured to detect a rotational angle of the upper steering shaft as a steering angle MA is installed. A steering torque sensor 52 configured to detect a steering torque MT is installed on the pinion shaft 34. In the steering transmission ratio variable device 14, a rotational angle sensor 54 configured to detect a relative rotational angle θre of the steering transmission ratio variable device 14, namely, a relative rotational angle of the lower steering shaft 30 with respect to the upper steering shaft 28 is installed.

A signal representing the steering angle MA and a signal representing the relative rotational angle θre are input to the steering transmission ratio control device 16. In this case, a rotational angle of the lower steering shaft 30 or the pinion shaft 34 may be detected to acquire the relative rotational angle θre as a difference between the rotational angle of the lower steering shaft 30 or the pinion shaft 34 and a steering angle MA.

In the vehicle 12, a vehicle speed sensor 56 configured to detect a vehicle speed V is installed, and in the motor 40 of the electric power steering device 18, a rotational angle sensor 58 configured to detect a rotational angle φ of the motor 40 is installed. A signal representing the vehicle speed V, a signal representing the steering torque MT, and a signal representing the rotational angle φ are input to the EPS control device 20.

In the vehicle 12, a CCD camera 60 configured to image a forward view of the vehicle, and a selection switch 62 configured to select whether or not to carry out a trajectory control (also referred to as "lane keeping assist (LKA) control") of controlling the vehicle to travel along a lane are installed. The selection switch 62 is configured to be operated by an occupant of the vehicle, and switch between an operation position (on) for operating the driving support control device 22 to carry out the trajectory control as driving support control and a non-operation position (off) for preventing the operation of the driving support control device 22. A signal representing image information on the front view of the vehicle taken by the CCD camera 60 and a signal representing the position (on or off) of the selection switch 62 are input to the driving support control device 22.

Further, signals representing motion state amounts of the vehicle required for the driving support control for the vehicle 12, such as a yaw rate, a longitudinal acceleration, and a lateral acceleration of the vehicle 12 are input to the driving support control device 22 from a motion state detection device 64. In this case, the image information on the front view of the vehicle and information on a travel lane may be acquired by means other than the CCD camera 60, or may be acquired by a combination of the CCD camera 60 and other means.

Each of the steering transmission ratio control device 16, the EPS control device 20, and the driving support control device 22 may comprise a processor and a memory. For example, each of the control devices may include a microcomputer including a CPU, a ROM, a RAM, and an input/output port device mutually connected with one another via a bidirectional common bus. The steering transmission ratio control device 16, the EPS control device 20, and the driving support control device 22 mutually transmit and receive information through communication as necessary. The steering transmission ratio control device 16, the EPS control device 20, and the driving support control device 22 may be configured as independent controllers or as an integral controller. The steering angle sensor 50, the steering torque sensor 52, and the rotational angle sensor 54 respectively detect the steering angle MA, the steering torque MT, and the relative rotational angle θre with the steering for a left turn direction of the vehicle being considered as positive.

As detailed later, the steering transmission ratio control device 16 is configured to control the steering transmission ratio variable device 14 in accordance with a flowchart illustrated in FIG. 2, thereby carrying out steering transmission ratio control. The EPS control device 20 is configured to control the electric power steering device 18 in accordance with a flowchart illustrated in FIG. 3, thereby carrying out steering assist torque control. The driving support control device 22 is configured to control the electric power steering device 18 in accordance with a flowchart illustrated in FIG. 4, thereby carrying out driving support control. When the selectin switch 62 is on, the LKA control is carried out as the driving support control. When the selection switch 62 is off, automatic steering (emergency avoidance steering) for emergency avoidance such as causing the vehicle 12 to travel while avoiding an obstacle is carried out as the driving support control.

<Steering Transmission Ratio Control>

Figure 2:
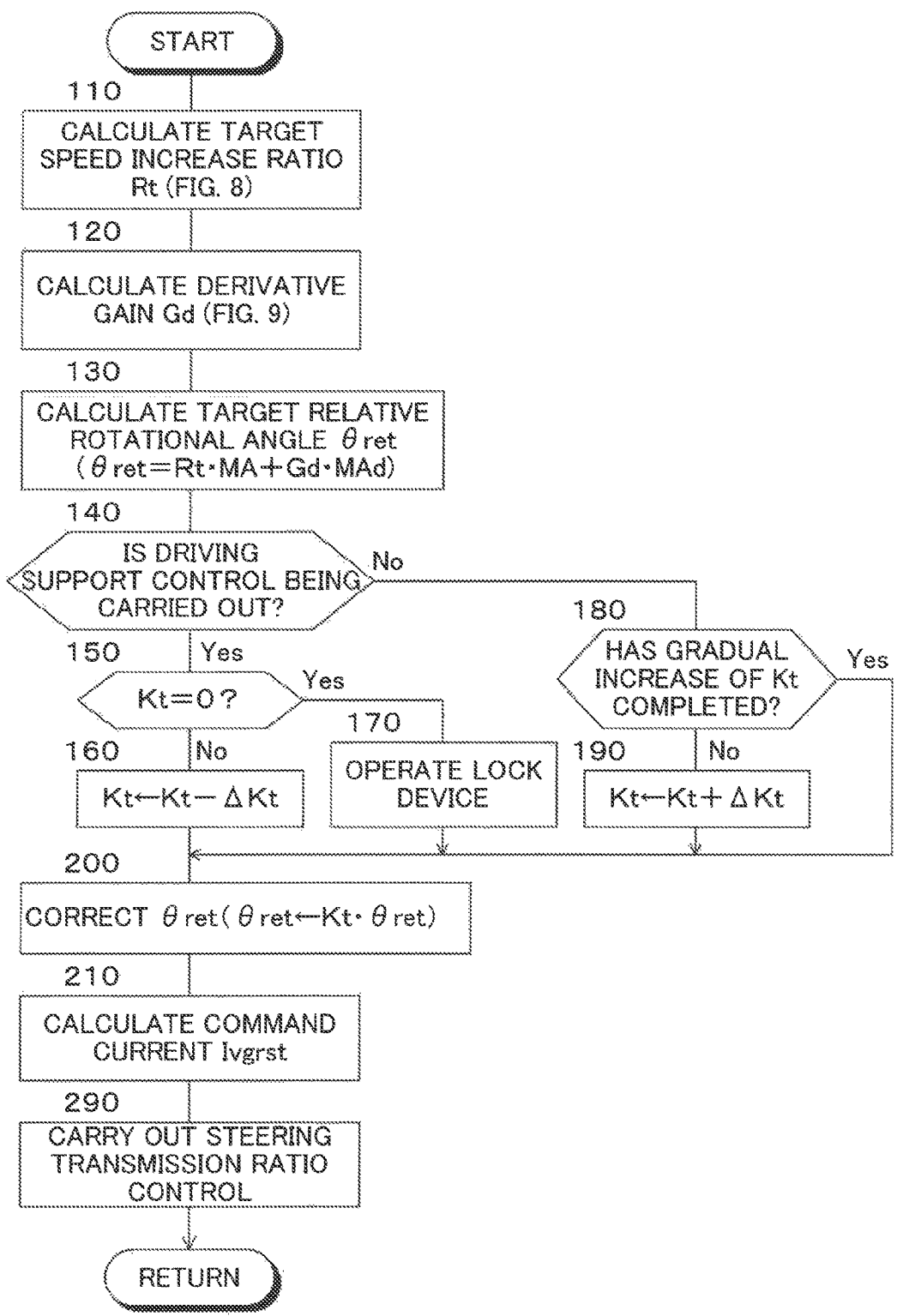
FIG. 2 is a flowchart for illustrating a steering transmission ratio control routine according to the first embodiment.

Referring to the flowchart illustrated in FIG. 2, a description is now given of the steering transmission ratio control routine in the first embodiment. The control in accordance with the flowchart illustrated in FIG. 2 is repeated at predetermined periods under a state in which an ignition switch, which is not illustrated in FIG. 1, is in an on state. This also applies to other control in accordance with flowcharts illustrated in FIG. 3 to FIG. 6.

Figure 8:
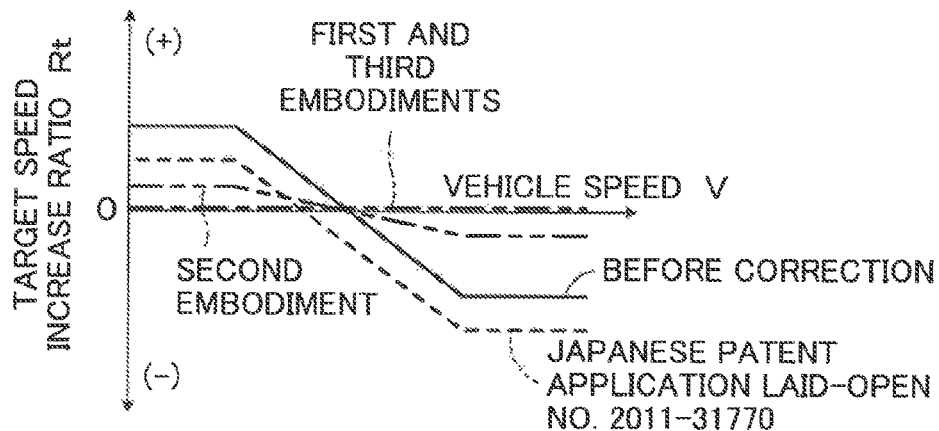
FIG. 8 is a map for showing a relationship between a vehicle speed V and a target speed increase ratio Rt.

In Step 110, first, by referring to a map indicated by the solid line of FIG. 8 based on the vehicle speed V, a target speed increase ratio Rt corresponding to a target steering transmission ratio is calculated. As shown in FIG. 8, the target speed increase ratio Rt is calculated so as to be a positive constant value in a very low speed range, to be a negative constant value in a high vehicle speed range, and to be a positive value gradually decreasing in the magnitude and then to be a negative value gradually increasing in the magnitude as the vehicle speed V increases in a low and medium vehicle speed range. Prior to Step 110, various signals are read, and the lock device 38 is set to the unlock position.

Figure 9:
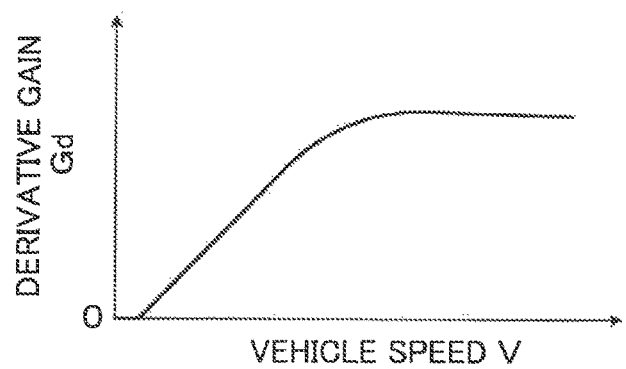
FIG. 9 is a map for showing a relationship between the vehicle speed V and a derivative gain Gd.

In Step 120, by referring to a map shown in FIG. 9 based on the vehicle speed V, a derivative gain Gd is calculated. As shown in FIG. 9, the derivative gain Gd is calculated so as to be a positive value gradually increasing in the magnitude as the vehicle speed V increases, and to be a substantially constant positive value in the high vehicle speed range. For example, the map may be set so that derivative gain increases linearly with vehicle speed until gradually levelling off after reaching a predetermined upper limit vehicle speed.

In Step 130, a target relative rotational angle θret of the steering transmission ratio variable device 14 is calculated in accordance with Equation (1) where MAd is a time derivative of the steering angle MA, namely, a steering speed.

$$\theta ret = Rt \cdot MA + Gd \cdot MAd \quad (1)$$

In Step 140, it is determined whether or not the driving support control is being carried out by the driving support control device 22. When a negative determination is made, the steering transmission ratio control proceeds to Step 180. When an affirmative determination is made, the steering transmission ratio control proceeds to Step 150. When the negative determination is made under the state in which the lock device 38 is switched to the lock position by the execution of Step 170 described later, after the lock device 38 is returned to the unlock position, the steering transmission ratio control proceeds to Step 180. In this step, when the following condition (a) or condition (b) is satisfied, the driving support control is determined to be carried out.
(a) The selection switch 62 is on.
(b) The selection switch 62 is off, but the emergency avoidance steering is being carried out.

In Step 150, it is determined whether or not a coefficient Kt for correcting the target relative rotational angle θret is 0, that is, whether or not a reduction in the coefficient Kt has been completed. When a negative determination is made, in Step 160, the coefficient Kt is decremented by ΔKt. In contrast, when an affirmative determination is made, in Step 170, the lock device 38 is switched to the lock position. In this case, ΔKt is 1/N where N is a positive constant integer.

In Step 180, it is determined whether or not a gradual increase in the coefficient Kt has been completed, that is, whether or not the coefficient Kt is 1. When a negative determination is made, in Step 190, the coefficient Kt is incremented by ΔKt. In contrast, when an affirmative determination is made, the steering transmission ratio control proceeds to Step 200.

When Step 160, Step 170, or Step 190 has been completed, the steering transmission ratio control proceeds to Step 200 as well. In Step 200, the target relative rotational angle θret is corrected to a product Kt θret, which is a product of the coefficient Kt and the target relative rotational angle θret calculated in Step 130.

In Step 210, a command current Ivgrst to be supplied to the steering transmission ratio variable device 14, for causing the relative rotational angle θre of the steering transmission ratio variable device 14 to reach the target relative rotational angle θret is calculated based on a difference Δθre (=θret−θre) between the target relative rotational angle θret and the actual relative rotational angle θre. Specifically, the command current Ivgrst is calculated in accordance with Equation (2) where Δθred and Δθred are respectively a time derivative and a time integral of the difference Δθre of the rotational angle, and Kvp, Kvd, and Kvi are respectively feedback gains (positive constants) set in advance.

$$Ivgrst = Kvp \cdot \Delta\theta re + Kvd \cdot \Delta\theta red + Kvi \cdot \Delta\theta red \quad (2)$$

In Step 290 that is carried out subsequently to Step 210, the command current Ivgrst is supplied to the motor 36 of the steering transmission ratio variable device 14, thereby controlling the relative rotational angle θre of the steering transmission ratio variable device 14 to reach the target relative rotational angle θret.

<Steering Assist Torque Control>

Figure 3:
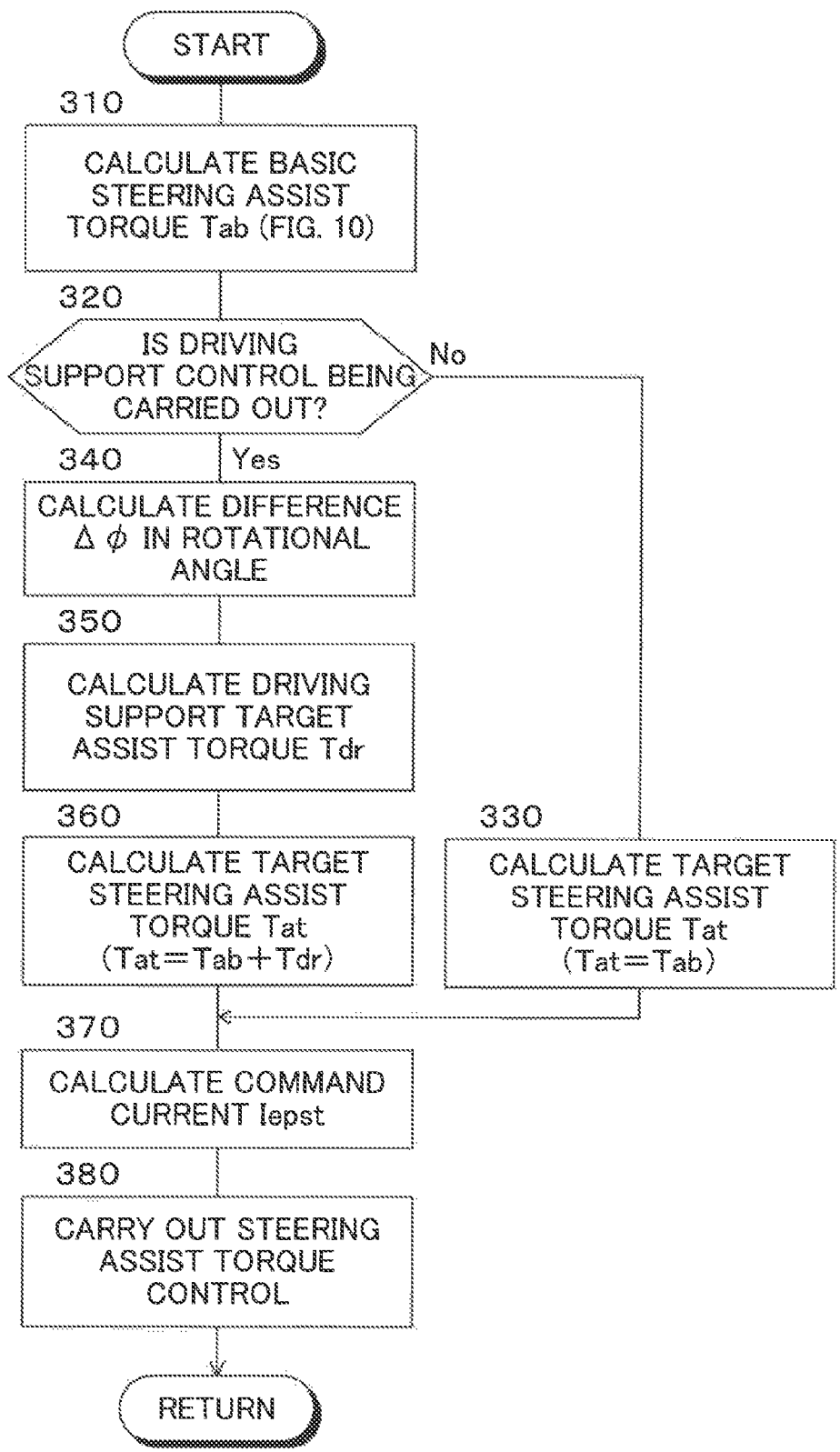
FIG. 3 is a flowchart for illustrating a basic steering assist torque control routine according to the first embodiment.

Referring to the flowchart illustrated in FIG. 3, a description is now given of the steering assist torque control routine in the first embodiment.

Figure 10:
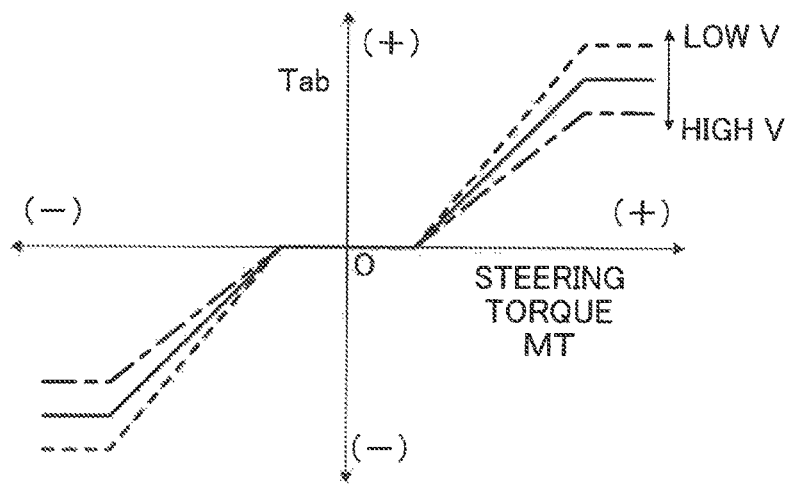
FIG. 10 is a map for showing a relationship between a steering torque MT and a basic steering assist torque Tab.

First, in Step 310, by referring to a map shown in FIG. 10 based on the steering torque MT and the vehicle speed V, a basic steering assist torque Tab is calculated. As shown in FIG. 10, the basic steering assist torque Tab is calculated so that the magnitude of the basic steering assist torque Tab increases as the absolute value of the steering torque MT increases, and the absolute value of the basic steering assist torque Tab increases as the vehicle speed V decreases. Prior to Step 310, various signals are read.

In Step 320, in the same way as Step 140, it is determined whether or not the driving support control is being carried out by the driving support control device 22. When an affirmative determination is made, the steering assist torque control proceeds to Step 340. When a negative determination is made, in Step 330, a target steering assist torque Tat is set to the basic steering assist torque Tab, and then, the steering assist torque control proceeds to Step 370.

In Step 340, a difference Δφ(=φt−φ) between a target rotational angle φ of the motor 40 of the electric power steering device 19 calculated in Step 480 of a flowchart illustrated in FIG. 4 described later and the actual rotational angle φ detected by the rotational angle sensor 58 is calculated.

In Step 350, a driving support target assist torque Tdr is calculated in accordance with Equation (3) where Δφd and Δφi are respectively a time derivative and a time integral of the difference Δφ of the rotational angle, and Kep, Ked, and Kei are respectively feedback gains (positive constants) set in advance.

$$Tdr = Kep \cdot \Delta\varphi + Ked \cdot \Delta\varphi d + Kei \cdot \Delta\varphi i \quad (3)$$

In Step 360, a sum Tab+Tdr of the basic steering assist torque Tab calculated in Step 310 and the driving support target assist torque Tdr is calculated as the target steering assist torque Tat.

In Step 370, a command current Iepst to be supplied to the electric power steering device 18, for causing the assist torque Ta generated by the electric power steering device 18 to reach the target steering assist torque Tat is calculated based on the target steering assist torque Tat.

In Step 380, the command current Iepst is supplied to the motor 40 of the electric power steering device 18, thereby controlling the assist torque Ta generated by the electric power steering device 18 to reach the target steering assist torque Tat. In particular, during the driving support control, the assist torque Ta is controlled so that the assist torque Ta conforms to the target steering assist torque Tat, and the magnitude of the difference Δφ in the rotational angle decreases.

<Driving Support Control>

Figure 4:
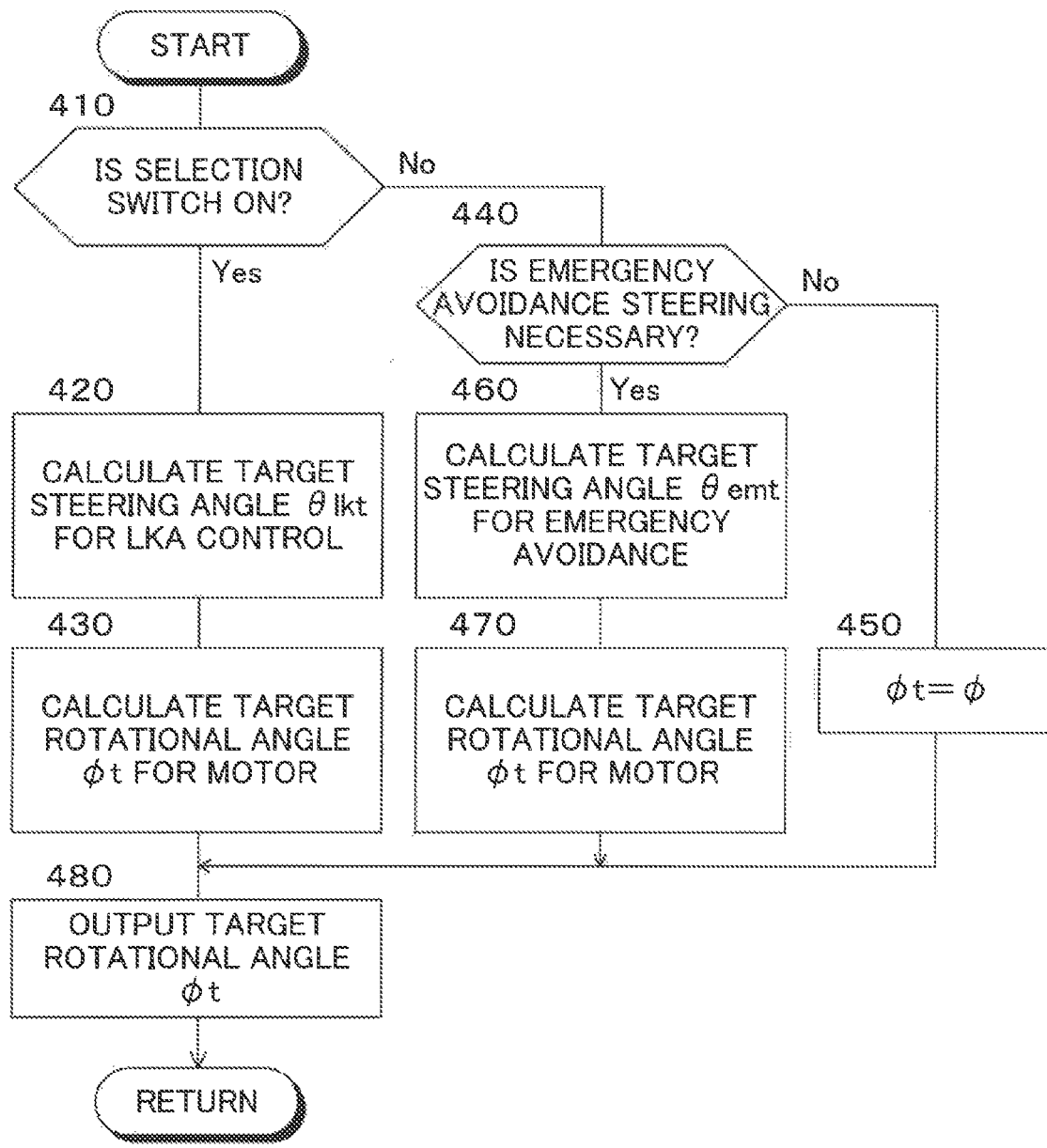
FIG. 4 is a flowchart for illustrating a driving support control routine according to the first embodiment.

Referring to the flowchart illustrated in FIG. 4, a description is now given of the driving support control routine in the first embodiment.

First, in Step 410, it is determined whether or not the selection switch 62 is on, that is, whether or not the LKA control is being carried out. When a negative determination is made, the driving support control proceeds to Step 440. When an affirmative determination is made, the driving support control proceeds to Step 420. Prior to Step 410, various signals are read.

In Step 420, based on the information on the front view of the vehicle taken by the CCD camera 60 and the like, a target steering angle θlkt for the LKA control, namely, a target rotational angle of the pinion shaft 34 for causing the vehicle 12 to travel along the travel lane is calculated. The calculation itself of the target steering angle θlkt will not be described in detail in the present disclosure, and may be carried out by any method publicly known in the art like the one described in Japanese Patent No. 5737197.

In Step 430, the target rotational angle φt of the motor 40 of the electric power steering device 18 required for the rotational angle of the pinion shaft 34 to reach the target steering angle θlkt is calculated based on the target steering angle θlkt, and then, the driving support control proceeds to Step 480.

In Step 440, it is determined whether or not the automatic steering for the emergency avoidance is necessary. When a negative determination is made, in Step 450, the target rotational angle φt of the motor 40 is set to the current rotational angle φ detected by the rotational angle sensor 58, and then, the driving support control proceeds to Step 480. In contrast, when an affirmative determination is made, the driving support control proceeds to Step 460.

In Step 460, a target steering angle θemt for the automatic steering for the emergency avoidance, namely, a target rotational angle of the pinion shaft 34 for causing the vehicle 12 to travel while avoiding an obstacle is calculated. The calculation itself of the target steering angle θemt will not be described in detail in the present disclosure, and may be carried out by any method publicly known in the art like the one described in Japanese Patent Application Laid-open No. 2009-184675.

In Step 470, the target rotational angle φt of the motor 40 of the electric power steering device 18 required for the rotational angle of the pinion shaft 34 to reach the target steering angle θemt is calculated based on the target steering angle θemt, and then, the driving support control proceeds to Step 480.

In Step 480, a signal representing the target rotational angle φt is output from the driving support control device 22 to the EPS control device 20.

As appreciated from the description given above, when the selection switch 62 is in the operation position (on), the steering transmission ratio control device 16, the EPS control device 20, and the driving support control device 22 respectively operate as described above. In other words, by the driving support control device 22 carrying out the driving support control in accordance with the flowchart illustrated in FIG. 4, the target steering angle θlkt for the front wheels 19FL and 19FR for causing the vehicle 12 to travel along the predetermined travel path is calculated. By the EPS control device 20 controlling the steering assist torque in accordance with the flowchart illustrated in FIG. 3, the steering load on the driver is reduced, and the steering angle of the front wheels 19FL and 19FR is controlled to reach the steering angle corresponding to the target steering angle θlkt.

Further, by the steering transmission ratio control device 16 carrying out the steering transmission ratio control in accordance with the flowchart illustrated in FIG. 2, the magnitude of the target relative rotational angle θret of the steering transmission ratio variable device 14 is reduced to 0. As a result, the steering transmission ratio variable device 14 does not rotate the upper steering shaft 28 and the lower steering shaft 30 relatively to each other, and thus the steering transmission system is equivalent to the steering transmission system in which the steering transmission ratio variable device 14 is not installed.

In terms of the target speed increase ratio Rt shown in FIG. 8, the above-mentioned control is equivalent to control of calculating the target speed increase ratio Rt in accordance with a map indicated by the long dashed short dashed line of FIG. 8, and controlling the steering transmission ratio based on the calculated target speed increase ratio Rt. Thus, the steering transmission ratio variable device 14 does not rotate the lower steering shaft 30 with respect to the upper steering shaft 28, and thus the reaction force is not generated to rotate the upper steering shaft 28. Thus, a reciprocal rotation of the upper steering shaft 28 can be prevented from being repeated, and as a result, a minute vibration of the steering wheel 24 and a vibration change in a steering reaction force can be prevented from being generated.

In the travel control device described in Japanese Patent Application Laid-open No. 2011-31770, when the driving support control is being carried out, the target speed increase ratio Rt is calculated, for example, in accordance with a map indicated by the broken line of FIG. 8. Thus, this processing cannot reduce the magnitude of the relative rotational angle between the upper steering shaft 28 and the lower steering shaft 30, with the result that the above-mentioned actions and effects cannot be provided and the minute vibration of the steering wheel 24 and the vibration change in the steering reaction force cannot be prevented.

Moreover, in a state in which the target steering angle for the driving support for the front wheels 19FL and 19FR does not change, when the driver carries out the steering operation, the magnitude of the difference between the target steering angle for the driving support and the actual steering angle increases, and the assist torque proportional to the difference acts in a direction opposite to the steering by the driver. Thus, in the related-art travel control device, the driver feels a large steering reaction force.

On the other hand, according to the first embodiment, the magnitude of the target relative rotational angle θret of the steering transmission ratio variable device 14 is reduced to 0, and compared to a case in which the magnitude of the target relative rotational angle θret is not reduced, the magnitude of the difference between the target steering angle for the driving support and the actual steering angle can be reduced. Thus, the magnitude of the assist torque acting in the direction opposite to the steering by the driver in proportion to the difference between the target steering angle for the driving support and the actual steering angle can be reduced, thereby reducing the steering reaction force felt by the driver. Those actions and effects are similarly provided in other embodiments described later.

In particular, according to the first embodiment, when the coefficient Kt is changed between 1 and 0, the coefficient Kt is gradually decreased and increased. Thus, compared to a case in which the coefficient Kt is changed between 1 and 0 without the gradual decrease and the gradual increase, a rapid change in the steering transmission ratio and generation of a sense of discomfort caused by the rapid change can be avoided.

Second Embodiment

Figure 5:
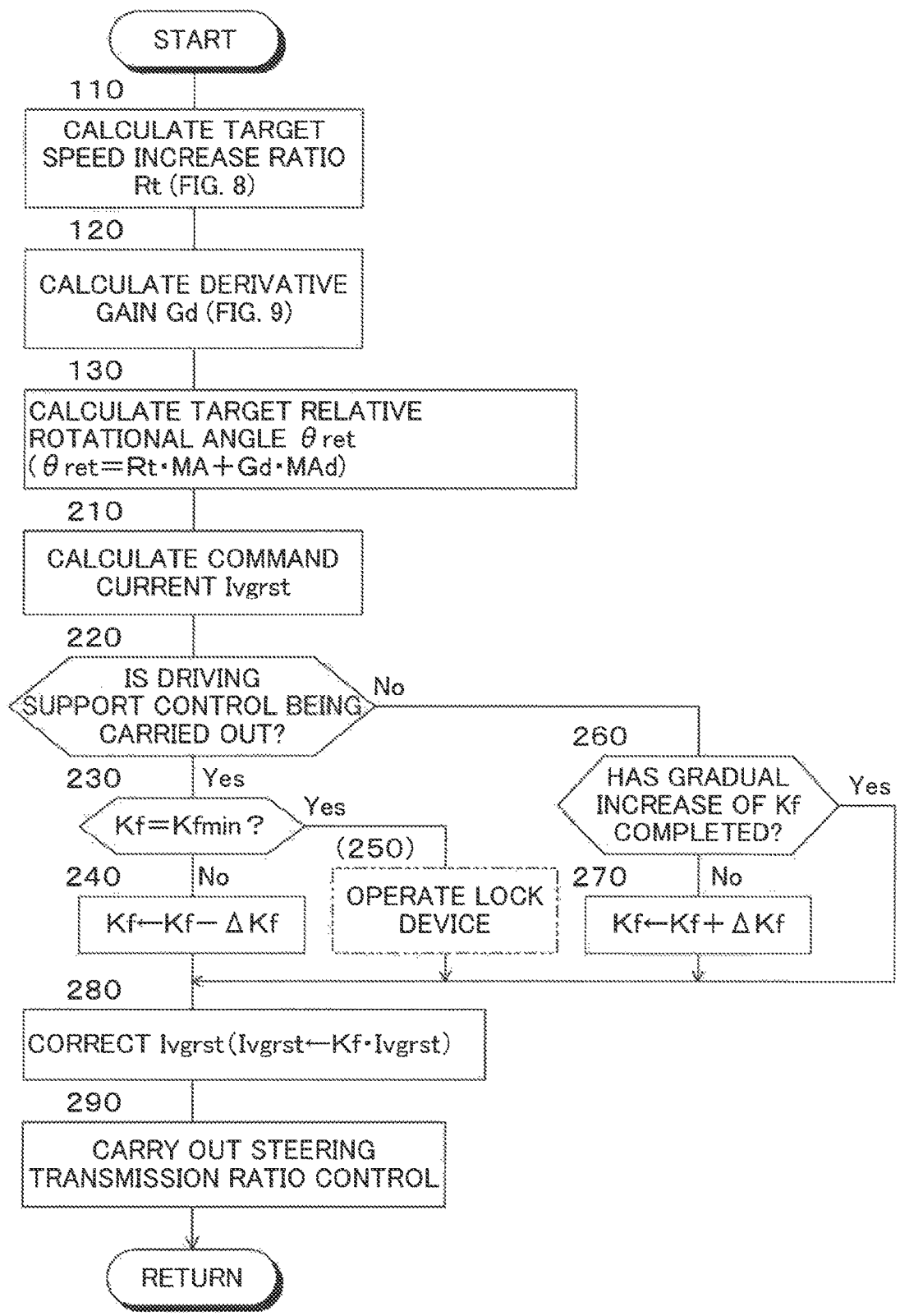
FIG. 5 is a flowchart for illustrating a steering transmission ratio control routine of a travel control device for a vehicle according to a second embodiment of the present disclosure.

FIG. 5 is a flowchart for illustrating a steering transmission ratio control routine of a travel control device for a vehicle according to a second embodiment of the present disclosure. In FIG. 5, the same steps as those step illustrated in FIG. 2 are denoted by the same step number as that assigned in FIG. 2. The same applies to FIG. 6 and FIG. 7 referred to later.

In the second embodiment, the steering assist torque control and the driving support control that are carried out respectively by the EPS control device 20 and the driving support control device 22 are carried out in accordance with the flowcharts illustrated in FIG. 3 and FIG. 4, respectively, as in the case of the first embodiment described above. The same applies to third and fourth embodiments of the present disclosure described later.

As appreciated from a comparison between FIG. 5 and FIG. 2, Step 110 to Step 130, Step 210, and Step 290 are carried out in the same way as the corresponding steps of the first embodiment, and when Step 210 is completed, the steering transmission ratio control proceeds to Step 220.

In Step 220, it is determined whether or not the driving support control is being carried out by the driving support control device 22 in the same way as in the case of Step 140 of the first embodiment. When a negative determination is made, the steering transmission ratio control proceeds to Step 260. When an affirmative determination is made, the steering transmission ratio control proceeds to Step 230.

In Step 230, it is determined whether or not a coefficient Kf for correcting the target relative rotational angle θret is the minimum value Kfmin (positive constant less than 1) set in advance, that is, whether or not the reduction of the coefficient Kf has been completed. When an affirmative determination is made, the steering transmission ratio control proceeds to Step 280. When a negative determination is made, in Step 240, the coefficient Kf is decremented by ΔKf. In this case, ΔKf is 1/M where M is a positive constant integer. A description is later given of Step 250.

In Step 260, it is determined whether or not a gradual increase in the coefficient Kf has been completed, that is, whether or not the coefficient Kf is 1. When a negative determination is made, in Step 270, the coefficient Kf is incremented by ΔKf. In contrast, when an affirmative determination is made, the steering transmission ratio control proceeds to Step 280.

When Step 240 or Step 270 has been completed, the steering transmission ratio control proceeds to Step 280. In Step 280, the command current Ivgrst to be supplied to the steering transmission ratio variable device 14 is corrected to a product Kf Ivgrst, which is a product of the coefficient Kf and the command current Ivgrst calculated in Step 210.

As appreciated from the description given above, according to the second embodiment, under the state in which the driving support control is being carried out, the command current Ivgrst is reduced by a factor of Kf, which is the positive constant smaller than 1. Thus, according to the second embodiment, the adverse effect from the steering transmission ratio control can be reduced as much as possible. In other words, the steering transmission ratio variable device 14 does not rotate the lower steering shaft 30 by a large angle with respect to the upper steering shaft 28, and thus the reaction force of the rotation does not rotate the upper steering shaft 28 by a large angle. Thus, the reciprocal rotation of the upper steering shaft 28 can be prevented from being repeated, and as a result, a possibility of the generation of the minute vibration of the steering wheel 24 and the vibration change in the steering reaction force can be reduced.

The above-mentioned control is, in terms of the target speed increase ratio Rt shown in FIG. 8, equivalent to control of calculating the target speed increase ratio Rt in accordance with a map indicated by the long dashed double-short dashed line of FIG. 8, and controlling the steering transmission ratio based on the calculated target speed increase ratio Rt.

In particular, according to the second embodiment, when the coefficient Kf is changed between 1 and Kfmin, the coefficient Kf is gradually decreased and increased. Thus, compared to a case in which the coefficient Kf is changed between 1 and Kfmin without the gradual decrease and the gradual increase, a rapid change in the steering transmission ratio and generation of a sense of discomfort caused by the rapid change can be avoided.

Third Embodiment

Figure 6:
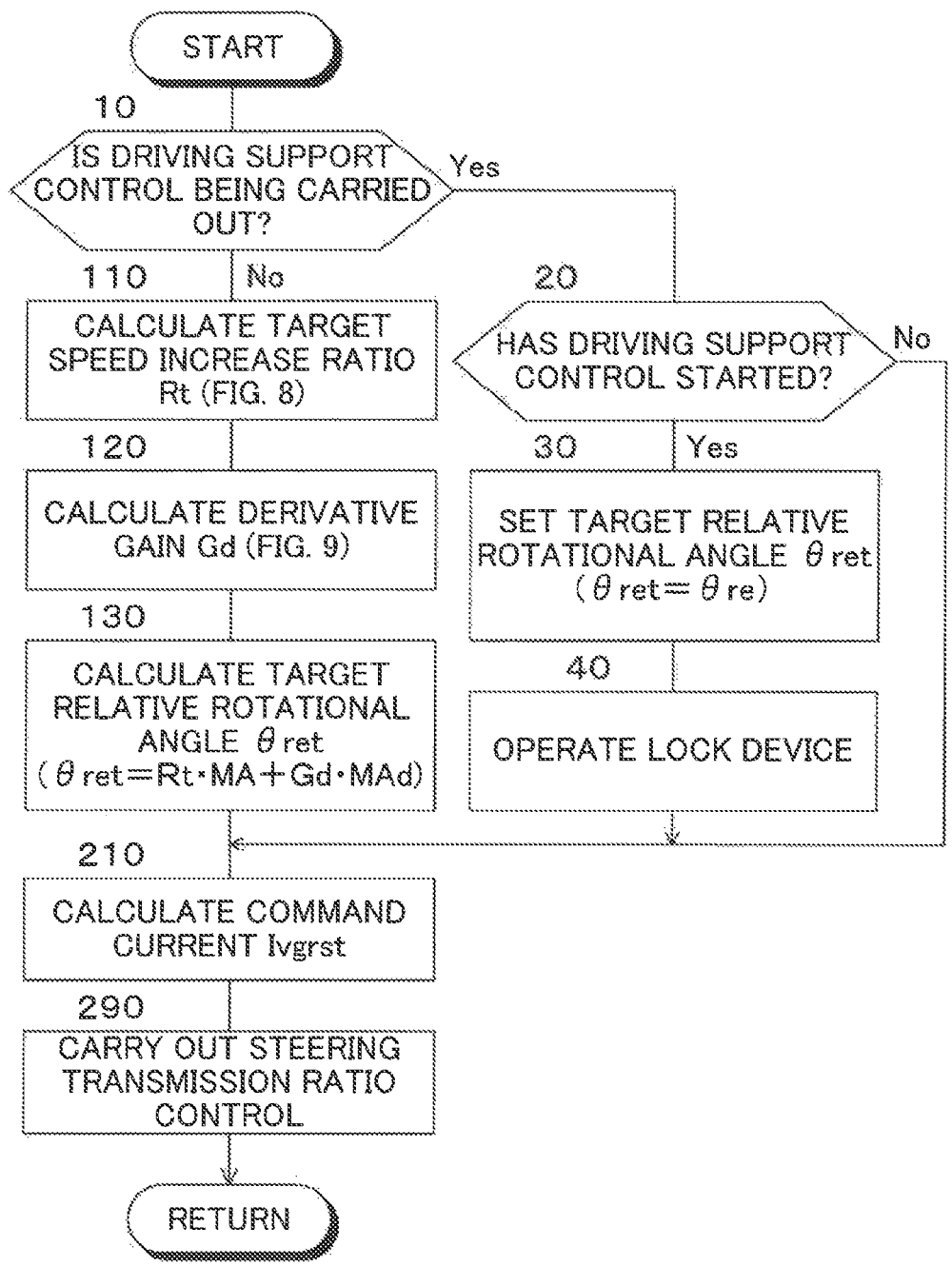
FIG. 6 is a flowchart for illustrating a steering transmission ratio control routine of a travel control device for a vehicle according to a third embodiment of the present disclosure.

FIG. 6 is a flowchart for illustrating a steering transmission ratio control routine of a travel control device for a vehicle according to a third embodiment of the present disclosure.

As appreciated from a comparison between FIG. 6 and FIG. 2, also in the third embodiment, Step 110 to Step 130, Step 210, and Step 290 are carried out in the same way as the corresponding steps of the first embodiment. Step 10 is carried out prior to Step 110, and when Step 130 is completed, the steering transmission ratio control proceeds to Step 210.

In Step S10, it is determined whether or not the driving support control is being carried out by the driving support control device 22 in the same way as in the case of Step 140 of the first embodiment. When a negative determination is made, the steering transmission ratio control proceeds to Step 110. When an affirmative determination is made, the steering transmission ratio control proceeds to Step S20. When the negative determination is made under the state in which the lock device 38 is switched to the lock position by the execution of Step S40 described later, after the lock device 38 is returned to the unlock position, the steering transmission ratio control proceeds to Step 110.

In Step S20, it is determined whether or not the driving support control has been started by the driving support control device 22, that is, whether or not the state in which the driving support control is not being carried out has changed to the state in which the driving support control is being carried out. When a negative determination is made, the steering transmission ratio control proceeds to Step 210. When an affirmative determination is made, the steering transmission ratio control proceeds to Step S30.

In Step S30, the target relative rotational angle θret of the steering transmission ratio variable device 14 is set to the current relative rotational angle θre detected by the rotational angle sensor 54.

In Step S40, the lock device 38 is switched to the lock position, and then, the steering transmission ratio control proceeds to Step 210.

According to the third embodiment, when the driving support control is started by the driving support control device 22, in Step S10 and Step S20, the affirmative determinations are made, and in Step S30, the target relative rotational angle θret is set to the current relative rotational angle θre. The target relative rotational angle θret is maintained to be the relative rotational angle θre set in Step S30 as long as the driving support control is being carried out.

As appreciated from the description given above, according to the third embodiment, under the state in which the driving support control is being carried out, the control amount of the steering transmission ratio variable device 14 can be set to 0. Thus, the reciprocal rotation of the upper steering shaft 28 can be prevented from being repeated in the same way as in the first embodiment described above, and as a result, the generation of the minute vibration of the steering wheel 24 and the vibration change in the steering reaction force can be prevented.

Fourth Embodiment

Figure 7:
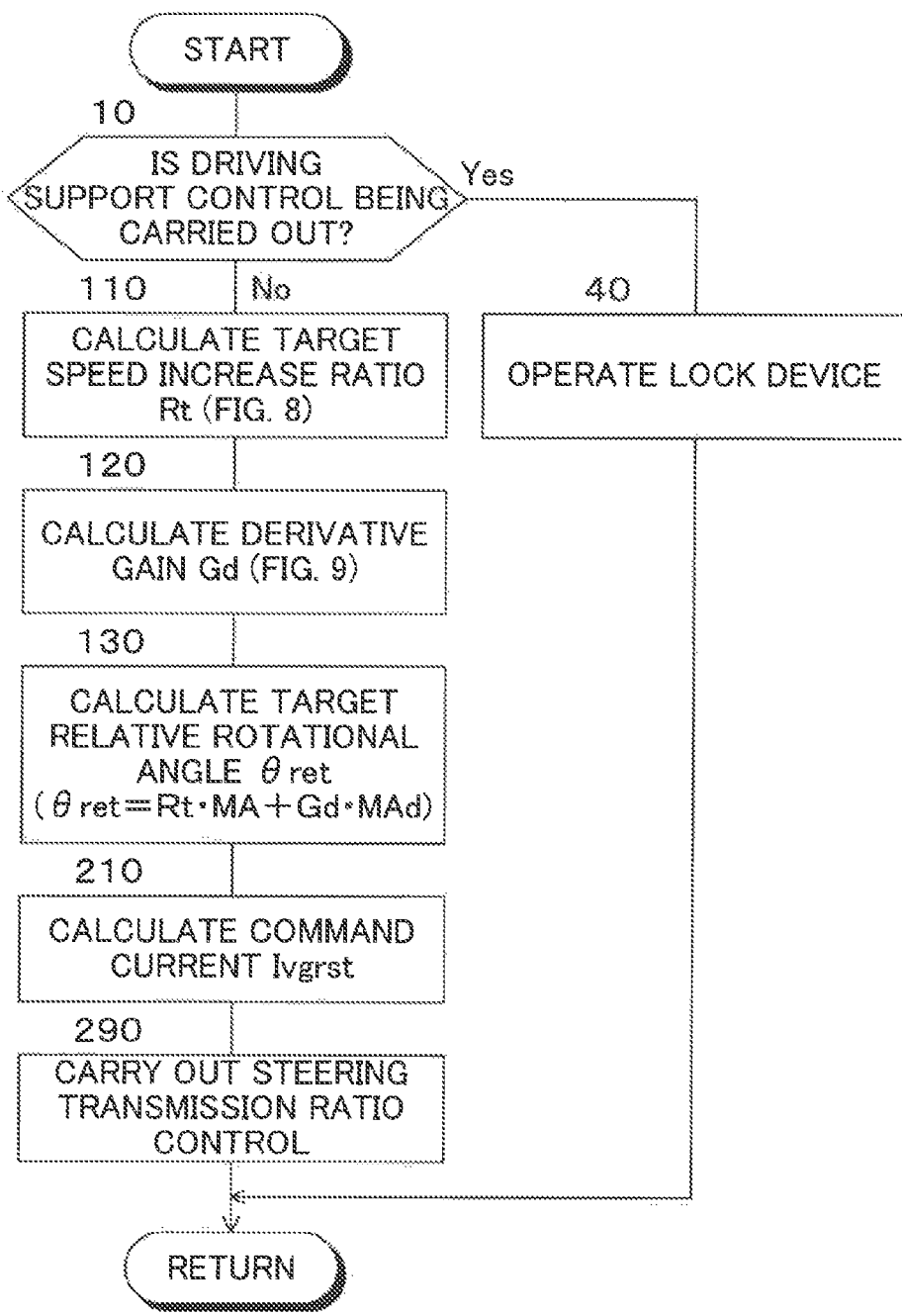
FIG. 7 is a flowchart for illustrating a steering transmission ratio control routine of a travel control device for a vehicle according to a fourth embodiment of the present disclosure.

FIG. 7 is a flowchart for illustrating a steering transmission ratio control routine of a travel control device for a vehicle according to a fourth embodiment of the present disclosure.

As appreciated from a comparison between FIG. 7, FIG. 2, and FIG. 6, also in the fourth embodiment, Step 110 to Step 130, Step 210, and Step 290 are carried out in the same way as the corresponding steps of the first embodiment. Step S10 is carried out in the same way as Step S10 according to the third embodiment. In Step S10, when the affirmative determination is made, in Step S40, the lock device 38 is switched to the lock position, and then, the steering transmission ratio control is once finished.

As in the case of the third embodiment, in Step 10, when the negative determination is made under the state in which the lock device 38 is switched to the lock position by the execution of Step 40 described later, after the lock device 38 is returned to the unlock position, the steering transmission ratio control proceeds to Step 110.

According to the fourth embodiment, under the state in which the driving support control is being carried out, the lock device 38 is switched to the lock position, and the upper steering shaft 28 and the lower steering shaft 30 are brought into a state of being integrally coupled to each other via the steering transmission ratio variable device 14. The steering transmission ratio variable device 14 does not rotate the upper steering shaft 28 and the lower steering shaft 30 relatively to each other. Thus, the reciprocal rotation of the upper steering shaft 28 caused by the steering transmission ratio variable device 14 trying to rotate the lower steering shaft 30 with respect to the upper steering shaft 28 is not generated, and the minute vibration of the steering wheel 24 and the vibration change in the steering reaction force are not generated.

Some specific embodiments of the present disclosure are described in detail above. However, the present application is not limited to the above-mentioned embodiments. It is apparent for those skilled in the art that various other embodiments may be employed within the scope of the present disclosure.

For example, in the above-mentioned respective embodiments, even when the selection switch 62 is at the non-operation position, the emergency avoidance steering is carried out in case of emergency, and during the emergency avoidance steering, it is determined that the driving support control is being carried out. However, the travel control device according to the present disclosure may be applied to a vehicle in which the emergency avoidance steering is not carried out.

Moreover, according to the first embodiment, during the driving support control, the coefficient Kt is reduced to 0, but similarly to the coefficient Kf, the coefficient kt may be corrected to be reduced to a positive value less than 1.

Moreover, according to the first embodiment and the third embodiment, the lock device 38 is configured to be operated in Step 170 and Step 40, respectively. However, those steps may be omitted.

Moreover, according to the second embodiment, during the driving support control, the feedback gains Kvp, Kvd, and Kvi in Equation (2) are reduced all at once as a result of the reduction in the coefficient Kf. However, during the driving support control, the feedback gains Kvp, Kvd, and Kvi may be individually corrected to be reduced.

Further, according to the second embodiment, the minimum value Kfmin is a positive constant, but the minimum value Kfmin may be 0. In this case, as represented by the long dashed double-short dashed line of FIG. 5, such a correction may be made that, when the affirmative determination is made in Step 230, the lock device 38 is switched to the lock position in Step 250, and then, the steering transmission ratio control proceeds to Step 280. Moreover, in this case, when the negative determination is made in Step 220 under the state in which the lock device 38 is switched to the lock position, after the lock device 38 is returned to the unlock position, the steering transmission ratio control proceeds to Step 260.

What is claimed is:

1. A travel control device for a vehicle, comprising:
    a steering transmission ratio variable device, which is installed in a steeling transmission system between a steeling wheel and steered wheels, and is configured to rotate a lower steeling shaft with respect to an upper steering shaft, to thereby change a steering transmission ratio;
    a steering transmission ratio controller, which is configured to calculate a target value of a relative rotational angle between the upper steering shaft and the lower steeling shaft, which is required to achieve a target steering transmission ratio, and to control the steering transmission ratio variable device so that an actual relative rotational angle conforms to the target value;
    a power steering device, which is installed in the steeling transmission system between the steered wheels and the steering transmission ratio variable device, and is configured to generate a steering assist torque;
    a steering assist torque controller, which is configured to calculate a target steeling assist torque, and to control the power steering device so that an actual steering assist torque conforms to the target steeling assist torque; and
    a driving support controller, which is configured to calculate a target steering angle of the steered wheels for causing the vehicle to travel along a predetermined travel path, and to correct the target steeling assist torque so that an actual steering angle of the steered wheels conforms to the target steeling angle,
    wherein the steering transmission ratio controller is configured to decrease a range of the relative rotational angle controlled by the steeling transmission ratio variable device when the driving support controller is engaged compared to when the driving support controller is not engaged.

2. The travel control device according to claim 1, wherein the steering transmission ratio controller is configured to calculate the target value of the relative rotational angle to be 0 for every speed of the vehicle when the driving support controller is engaged.

3. The travel control device according to claim 1, wherein the steering transmission ratio controller is configured to acquire, when the driving support controller starts an operation thereof, a current value of the relative rotational angle, and calculate, when the driving support controller is engaged, the target value of the relative rotational angle to be the current value, to thereby cause the change in the relative rotational angle controlled by the steering transmission ratio variable device to be 0 for every speed of the vehicle.

4. The travel control device according to claim 1, wherein:
    the steering transmission ratio variable device comprises
    a lock device configured to block a relative rotation between the upper steering shaft and the lower steering shaft; and the steering transmission ratio controller is configured to operate, when the driving support controller is engaged, the lock device so that the change in the relative rotational angle controlled by the steering transmission ratio variable device is 0 for every speed of the vehicle.

5. The travel control device according to claim 1, wherein the steering transmission ratio controller is configured to apply, based on the target value of the relative rotational angle and a current value of the relative rotational angle, feedback control to the steering transmission ratio variable device so that a magnitude of a difference between the target value of the relative rotational angle and the current value of the relative rotational angle decreases, and to decrease a gain of the feedback control when the driving support controller is engaged compared to when the driving support controller is not engaged.

6. The travel control device according to claim 1, wherein:
the vehicle comprises a switch to be operated by an occupant, configured to switch between an engaged position in which the driving support controller is engaged and a non-engaged position in which the driving support controller is not engaged; and
the steering transmission ratio control device is configured to determine that the driving support controller is engaged when the switch is in the engaged position.

7. The travel control device according to claim 6, wherein:
the driving support controller is configured to calculate, even when the switch is in the non-engaged position, a target steering angle of the steered wheels required for an emergency avoidance, and carry out emergency avoidance steering of correcting the target steering assist torque so that the actual steering angle of the steered wheels conforms to the target steering angle; and
the steering transmission ratio controller is configured to determine, also when the emergency avoidance steering is being carried out, that the driving support controller is engaged.

* * * * *